United States Patent [19]

Stein et al.

[11] Patent Number: 4,690,491

[45] Date of Patent: Sep. 1, 1987

[54] BUILDING DATA TRANSMISSION SYSTEM

[75] Inventors: David E. Stein, St. Louis, Mo.; Donald R. Hammer, Waterloo, Ill.

[73] Assignee: Southwestern Bell Telephone, St. Louis, Mo.

[21] Appl. No.: 784,565

[22] Filed: Oct. 4, 1985

[51] Int. Cl.[4] .............................................. G02B 6/28
[52] U.S. Cl. .................... 350/96.16; 455/612
[58] Field of Search ............... 350/96.15, 96.16, 96.20, 350/96.21, 96.22; 455/606, 607, 612

[56] References Cited

U.S. PATENT DOCUMENTS 4,511,208  4/1985  Ozeki et al. ...................... 350/96.16
4,528,695  7/1985  Khoe ............................... 350/96.16 X

OTHER PUBLICATIONS

Kulm, Doug, "Fiber Optics for Telephony Applications", *Telephony*, 5-20-85, pp. 88-96.
Amicone, M. R., "Fiber Optic Subscriber Feeder Sys.", *Telephony*, 5-20-85, pp. 70-78.
Deutsch Literature on 1000, 3000 and 6000 Series Connectors, and on Fiber Optic Termination Tool, all dated 1984.
Shinnick, W. J., and McIntosh, T. F., "Lightguide: Designing for Distribution System Flexibility", *Telephony*, 5-20-85, pp. 78-85 and 6-3-85, pp. 40-50.
Hardiman, Anthony J., "Pre-Connectorized Single Mode Fiber Optic Ribbon Cable . . . ", *Telephony*, 6-3-85, pp. 54-60.

*Primary Examiner*—Eugene R. LaRoche
*Assistant Examiner*—Steven J. Mottola
*Attorney, Agent, or Firm*—Neal Kalishman

[57]  ABSTRACT

An internal building data transmission system which uses optic fibers. It permits the flexible connection of work stations and equipment through the use of junction boxes, terminal boxes and distributing frames. The cables are connected by nonadhesive receptacles and are routed through the use of patch cord cables.

19 Claims, 7 Drawing Figures

ETHERNET & STAR

SYNCHRONIZED NETWORK & STAR

BUS NETWORK

RING NETWORK

BUILDING DATA TRANSMISSION SYSTEM

BACKGROUND OF THE INVENTION

I. Field of the Invention

The present invention is directed to data transmission systems which utilize fiber optic cables. More particularly the invention is concerned with transmission systems which pass data between electronic equipment within an office building.

II. Description of the Prior Art

The use of fiber optic cables in data transmission applications has several well known advantages. The main advantages are the speed of data transmission and the amount of data which can be sent through a relatively small fiber. Thus, a relatively large copper cable can be replaced by a fiber cable which has a much smaller diameter.

The office environment has experienced a dramatic increase in employee work stations which contain data transmitting and receiving equipment. Such equipment includes word processors, printers, monitors, copiers, etc. It has become desirable to connect these remote units to each other and to central core pieces of equipment such as computers. In the past the amount of such equipment which can be hooked together in an office building network has been limited by the amount of copper wire which can be placed in the floor and wall conduits.

Fiber optic cables have been employed in office applications to transmit data from one point to another. They have not been used to form a network similar to those possible with copper wire systems. That is, the fiber optic cables are normally run specifically from one piece of equipment to a second piece of equipment. This is compared to copper wire cables that can be connected to other cables through terminal boxes that allow distribution of data throughout a network of equipment. By changing the wire connections in the terminal box the routing of data from a work station can be changed.

Fiber optic cables have not been used in networking applications due to the problems associated with coupling such cables. Traditionally these cables have been adhesively bonded together. Although there are available nonadhesive couplers, they have not been used for networking applications but only as a means for connecting computer equipment to optic fiber cables.

The present invention is advantageous in that it allows the use of fiber optic cables in data transmission networks that have the same flexibility as copper wire networks. The invention is further advantageous in that it allows the use of floor junction boxes, terminal boxes, distributing frames and path cores in fiber optic networks. Another advantage of the invention is that the networks can be installed and maintained without highly skilled technicians. Further advantages include: relatively low cost, superior system reliability, and high versatility and growth potential.

SUMMARY OF THE INVENTION

A fiber optic building data transmission network having at least three data work stations which are non-serially connected. The system improvement which comprises the use of a nonadhesive connector means for connecting the system's fiber optic cables and a means for changing the pattern of the fiber optic network at central locations by the use of jumper cables.

DESCRIPTION OF THE PREFERRED EMBODIMENTS

Figure 1:
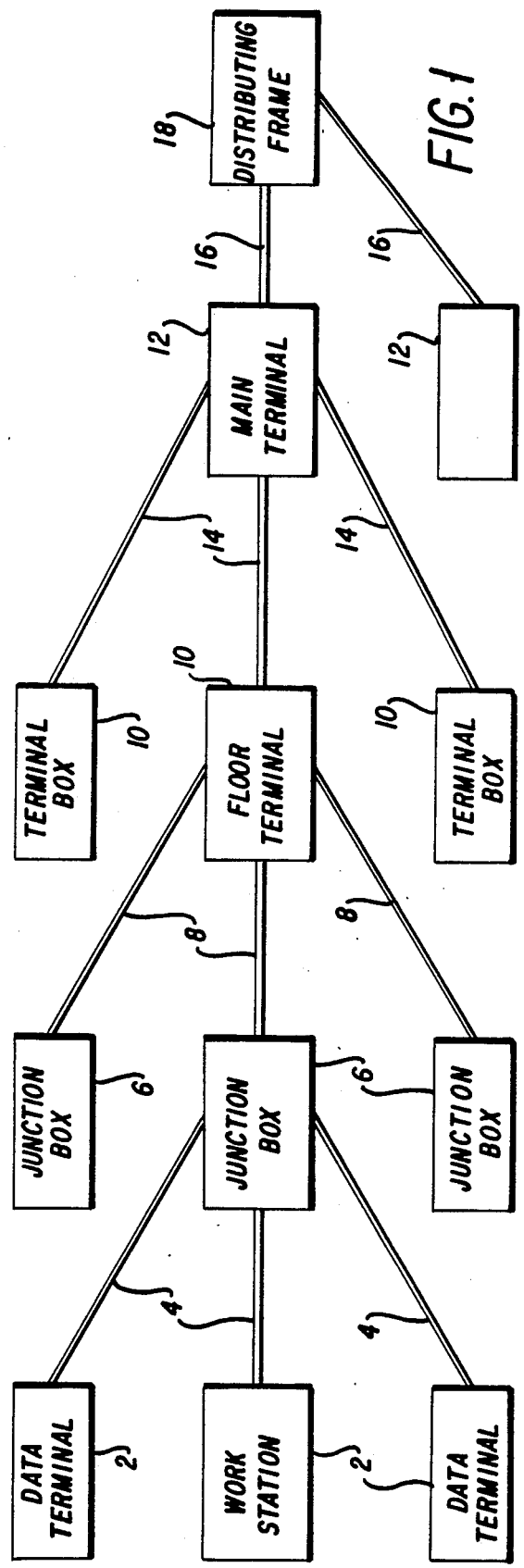
FIG. 1 is a schematic of an office building fiber optic network pursuant to the invention.

As shown in FIG. 1 the present invention provides a means for networking work station data terminals 2 through the use of fiber optic cables. The network comprises work station data terminals 2 which connect to floor or wall jacks or junction boxes 6 through a fiber optic cable 4. Each junction box 6 connected to a floor terminal box 10 through a fiber optic cable 8. The floor terminal box 10 allows the work station 2 to connect to other work stations or common core equipment. In larger buildings the cables 14 from the floor terminal boxes 10 terminate in main terminal boxes 12. Cables 16 from the main terminal boxes 12 run to the distribution frame 18. The fibers which terminate on the frame 18 can be connected to fibers which go to various pieces of network equipment.

The main attribute of the system is that it allows fiber optic cables to be used in place of copper wires in office buildings without sacrificing flexibility. Even though fiber optic cables have been used in office buildings for point to point transmission, the junction boxes, terminal boxes, and jumper cables permit the formation of a system through the use of non adhesive connections. Thus, by using a network approach terminals can communicate directly with each other and other pieces of equipment.

The data transmission system uses conventional data control systems in order to control the traffic through the network. Systems such as ethernet can be employed in the system. Therefore, conventional equipment which is normally associated with such systems will be part of the network. For instance, optical stars can be placed between the floor terminal box 10 and the main terminal box 12 in order to combine the data from sixteen fibers onto two fibers. Also, conventional controllers for routing data are used and preferably located at the distributing frame 18 or contained within processing equipment.

The fiber optic cables which are suitable for use in the invention are any of the commercialy available cables. The diameter of the cables will vary depending on the volume of messages it carries. The cables may contain a number of fibers depending on the route of the network. Usually a cable contains at least two fibers. The following apecifications are preferred:

Core:
  Diameter: 85 +/− 3 microns
  Ovality: 95%
  Center Offset: 3 microns
  Index of Refraction: 1.486

Cladding:
  Diameter: 125 +/− 3 microns
  Ovality: 98%
  Center Offset: 3 microns
  Index of Refraction: 1.457
  Composit Protection Coating: 250 +/− 15 microns
  Loose Buffer Diameter: 2 mm
  Numerical Aperture: 0.260 +/−0.015
Optical Loss:
  850 nm 3.7 dB/Km
  1300 nm 1.6 dB/Km
Cables Usage:
  2 fiber cables - under-carpet distribution to work stations
    4 fiber cables
    floor distribution to work stations or
    inter-floor distribution
    12 fiber cables
    inter-floor distribution The work station terminals 2 utilized in the system may be any data generating or receiving type equipment. Such terminals include but are not limited to computers, printers, word processors, photocopiers, telex equipment, office equipment, telephone equipment, industrial machinery, boilers, air conditioners, security systems, etc. Since most data terminals are not inherently compatible with fiber optic cables they must be attached to the cable through conventional adapters which convert their external output and input signals.

Figure 3:
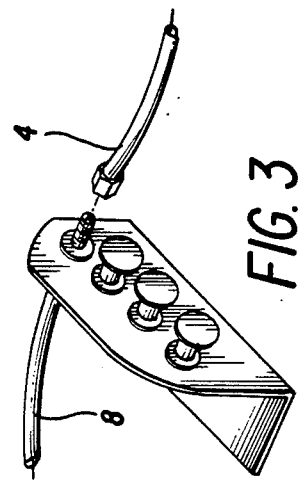
FIG. 3 is a perspective drawing of a junction box of the invention.

Either in the floor or on the wall near each work station or preferably serving a group of work stations is a junction box. The junction box contains a number of ports, at least two, for connecting a fiber optic cable from the work station to the work station terminal box. As shown in FIG. 3 the junction box is comprises of a base plate having receptacles which align the beam between the two cables. The receptacles hold the ends of the cables aligned through a non adhesive screw thread design.

The receptacles, have a hollow tubular center in which the ends of the fiber optic cables are inserted. The end tips of the cables are aligned by controlling the tolerance of the tube. The fiber optic cable must be just slightly smaller than the tubular opening. The receptacles have screw threads on their ends upon which the sleeve of the cables is screwed to preclude movement of the cable. An example of a receptacle which can be modified by precision grounding is the 3000 connector manufactured by Deutsch. In order for a receptacle to be operational in the system, the system must exhibit less than 0.75 db loss.

Optic fiber cables connect the junction box 6 ports to floor terminal boxes 10 which serve a number of junction boxes 6. Usually one terminal box 10 serves a floor of a building. The floor terminal boxes 10 function in the same manner as a terminal box in a conventional copper wire communications network. The floor terminal boxes 10 provide the cross communications between work station data terminals 2 and/or central processing equipment. By cross connecting at the floor terminal box 10, work stations can be connected to each other or any other piece of equipment in the system. Further, different ports from the work station data terminals 2 can be connected to different destinations at the floor terminal box 10. Also, nonfunctioning cables can be bypassed at the floor terminal box 10.

Figure 2:
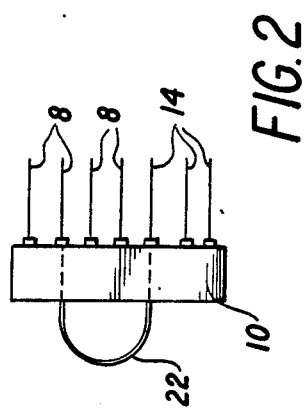
FIG. 2 is a schematic illustrating the use of jumper cables in a terminal box.
Figure 4:
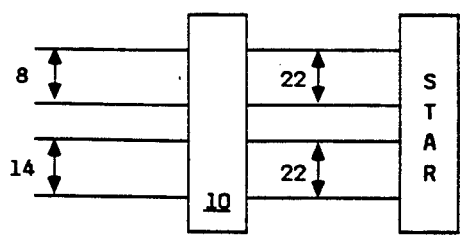
FIG. 4 is a schematic illustrating the use of an optic star and ethernet network.
Figure 5:
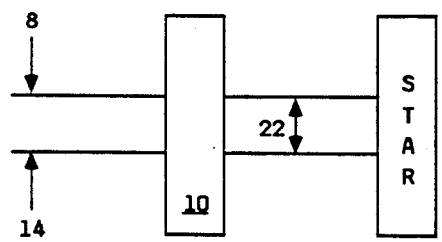
FIG. 5 is a schematic illustrating a synchronized network and optic star.
Figure 6:
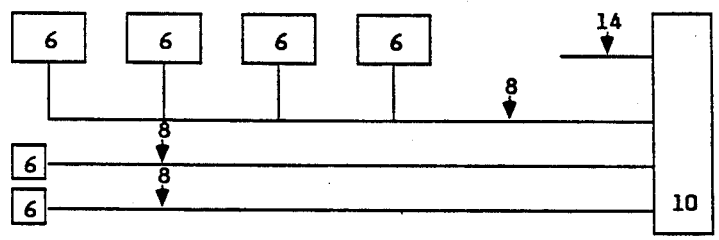
FIG. 6 is a schematic illustrating a bus network.
Figure 7:
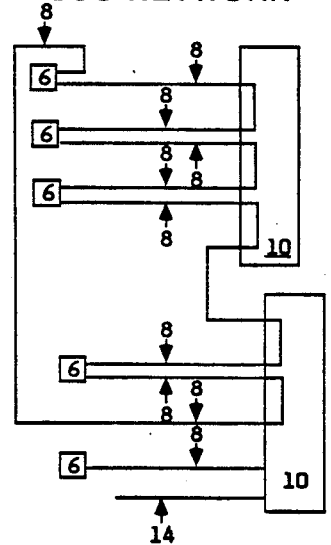
FIG. 7 is a schematic illustrating a ring network.

As shown in FIG. 2, the floor terminal box 10 contains a number of ports similar to those contained in the junction boxes 6. All of the cables 8 and 14 usually enter the box either from the side or rear of the box. Jumper cables 22, which are optic fiber cables, are used to connect the open ends of the ports. Thus connecting two optic fiber cables 8 and 14 and the equipment to which they run. By changing the ports that the jumper cables 22 connect, the network can be easily modified. Thus, the system flexibility is exhibited by the ease in which it can be modified.

As an example, a word processing station 2 is connected to a junction box 6 in the floor alongside the work processor 2. The optic fiber cable 4 connecting the word processor 2 and the junction box 6 should not be tensioned in order to prevent damage due to movement of the work processor. At the junction box 6, the cable 4 after passing through a signal converter is connected to a second fiber optic cable 8 which runs to a floor terminal box 10.

The optic fiber cable 8 terminates on a connector in the floor terminal box 10. Through a patch cord 22 the cable 8 is connected to communicate with another cable. This second cable could be another floor distribution cable 8 for direct communication with other local work stations which could include computers, printers etc. The second cable could also be a cable 14 which carries signals from the floor terminal 10 to a main terminal 12 or directly to a distributing frame 18. Preferably, optic stars are incorporated at the floor terminals 10 for outputting the data from the cables 8 which terminate at the floor terminals 10.

The main terminal boxes 12 have a similar design and serve a similar function as the floor boxes terminal boxes 10. The difference being that they consolidate the output from the floor terminal boxes 10 rather than the work stations 2. Again patch cords and nonadhesive connectors are used in the box to provide flexibility and control of the network.

From the main terminal box 12 the output cable 16 goes to the main distributing frame 18. This frame is a larger scale terminal box and has a large number of cables terminating on its rear side. All work stations and equipment which is connected to the frame 18 can be connected to any other work station or piece of equipment in the building through the attachment of a patch cord to the appropriate nonadhesive connectors upon which the cables 16 terminate.

It must be pointed out that the present invention is concerned only with the providing of the fiber optic network. It is irrelevant whether an ethernet or an IBM synchronized system is used. Ring, star and bus networks can be incorporated into the systems. Also, more than one system may be used and the individual work stations can be connected to more than one system by connecting the different data ports to different cables in the junction box. Those familiar with the various available systems would appreciate where to optimally position control equipment and what control equipment is necessary.

FIGS. 4, 5, 6 and 7 are illustrative of the possible use of synchronized, ethernet, ring, star and bus networks.

The network available through the use of adhesiveless connectors, patchcords and terminal boxes substantially expands the utility of using fiber optics in network applications. Thus, instead of limiting fiber optic cables to use in a point to point or local system, a flexible, changeable network can be used. An entire multistory office building can be connected to one system that can change with the needs of the tenants.

We claim

1. A fiber optic communications network for internal building data transmission having at least three data work station terminals which can communicate with each other but are not serially connected comprising:
   (a) at least three junction boxes each of which is connected to at least one work station terminal through no more than two fibers;
   (b) at least two floor distribution terminals to which at least two of said junction boxes are connected by fiber optic cable to different floor distribution terminals; and
   (c) nonadhesive connector and jumper cable means for changing the pattern of the network at said distribution terminals.

2. The network of claim 1 wherein said network further comprises at least one common main distribution terminal to which at least two floor distribution boxes are connected by fiber optic cable.

3. The network of claim 2 wherein said network comprises at least two main floor distribution terminals.

4. The network of claim 3 wherein at least two main distribution terminals are connected to a distributing frame by fiber optic cable.

5. The network of claim 1 wherein optic stars are associated with at least one floor distribution terminal.

6. The network of claim 2 wherein optic stars are associated with at least one floor and main distribution terminal.

7. The network of claim 2 wherein said network further comprises nonadhesive connector and jumper cable means for changing the pattern of the network at said main distribution terminals.

8. The network of claim 4 wherein said network further comprises nonadhesive connector and jumper cable means for changing the pattern of the network at said distributing frame.

9. A fiber optic communications network for internal building data transmission which utilizes multiple levels of nonadhesive cross connection points comprising:
   (a) multiple work station terminals each of which is connected to junction boxes through no more than two equal diameter optic fibers;
   (b) at least two floor distribution terminals to which different junction boxes are connected through optic fibers; and
   (c) at least one common main distribution terminal to which different floor distribution terminals are connected through optic fibers.

10. The network of claim 9 which further comprises a distribution frame which is connected by optic fibers to at least two main distribution terminals.

11. The network of claim 9 wherein an optic star is associated with at least one floor distribution terminal.

12. The network of claim 11 wherein an optic star is associated with at least one main distribution terminal.

13. The network of claim 9 wherein at least a section of said network comprises a synchronized network.

14. The network of claim 9 wherein at least a section of said network comprises an ethernet network.

15. The network of claim 1 wherein said network further comprises an ethernet system.

16. The network of claim 1 wherein said network further comprises a ring network.

17. The network of claim 1 wherein said network further compriss a star network.

18. The network of claim 1 wherein said network further comprises a bus network.

19. The network of claim 1 wherein said network further comprises a synchronized network.

* * * * *